US012574329B2

(12) United States Patent
Ye et al.

(10) Patent No.: US 12,574,329 B2
(45) Date of Patent: Mar. 10, 2026

(54) DATA EXCHANGE METHOD AND APPARATUS

(71) Applicant: HUAWEI TECHNOLOGIES CO., LTD., Shenzhen (CN)

(72) Inventors: Qiuhong Ye, Shenzhen (CN); Zijian He, Beijing (CN); Wan Lam, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 76 days.

(21) Appl. No.: 18/763,855

(22) Filed: Jul. 3, 2024

(65) Prior Publication Data

US 2024/0364636 A1     Oct. 31, 2024

Related U.S. Application Data

(63) Continuation of application No. PCT/CN2022/131459, filed on Nov. 11, 2022.

(30) Foreign Application Priority Data

Jan. 5, 2022    (CN) ......................... 202210010085.6

(51) Int. Cl.
| | |
|---|---|
| *H04L 47/265* | (2022.01) |
| *H04L 45/122* | (2022.01) |
| *H04L 47/625* | (2022.01) |

(52) U.S. Cl.
CPC .......... *H04L 47/265* (2022.05); *H04L 45/122* (2013.01); *H04L 47/6255* (2013.01)

(58) Field of Classification Search
CPC .. H04L 47/265; H04L 45/122; H04L 47/6255
See application file for complete search history.

(56) References Cited

U.S. PATENT DOCUMENTS 8,248,930 B2 *   8/2012  Felderman .............. H04L 47/10
                                                    370/232

* cited by examiner

*Primary Examiner* — Nazia Naoreen
(74) *Attorney, Agent, or Firm* — Leydig, Voit & Mayer, Ltd.

(57) ABSTRACT

A data exchange method and apparatus. The method includes: A source node receives flow indication information from a first switching node, where the flow indication information indicates that congestion occurs in a target data flow, and the first switching node is a node in a switching path of the target data flow. The source node sends multiple pieces of write data information and multiple data blocks of the target data flow to multiple switching nodes, where the multiple pieces of write data information indicate the multiple switching nodes to store the multiple data blocks and stop forwarding the multiple data blocks. The multiple switching nodes store the multiple data blocks. The multiple switching nodes receive multiple pieces of scheduling information from a destination node, where the multiple pieces of scheduling information are used to schedule the multiple data blocks.

10 Claims, 10 Drawing Sheets

Spine layer

Relay layer

Congestion notification (target data flow $f$)

DATA EXCHANGE METHOD AND APPARATUS

CROSS-REFERENCE TO RELATED APPLICATIONS

This application is a continuation of International Application No. PCT/CN2022/131459 filed on Nov. 11, 2022, which claims priority to Chinese Patent Application No. 202210010085.6, filed on Jan. 5, 2022. The disclosures of the aforementioned applications are hereby incorporated by reference in their entireties.

TECHNICAL FIELD

This application relates to the field of communication technologies, and in particular, to a data exchange method and apparatus.

BACKGROUND

A data exchange network generally adopts a networking mode of multi-level (for example, two-level or three-level) switching nodes, to provide a fully-connected network for multiple servers in an access network, so as to exchange data between different servers. In the data exchange network, each switching node has a buffer with a specific capacity. The buffer may be used to absorb a burst data flow: When to-be-scheduled traffic of a switching node exceeds a switching capability and a buffer capability of the switching node, phenomena such as head-of-line blocking and packet loss are caused. For example, when multiple source nodes simultaneously send data packets to a same output port of a destination node, congestion may occur in the output port because a buffer capacity of an output queue (which may also be referred to as a buffer queue) corresponding to the output port is limited, causing buffer overflow and further data packet loss and the like.

In a conventional technology, explicit congestion notification (ECN), priority-based flow control (PFC), and tail drop are usually used to control traffic in a data exchange network, so as to avoid buffer overflow: The ECN may be used to implement flow control on a source node (for example, a server or a mobile phone). For example, before congestion occurs, a switching node in a network indicates the source node to reduce a sending rate, so as to alleviate network congestion. The PFC may be used to implement flow control between switching nodes. For example, a downstream switching node indicates an upstream switching node to stop sending data, so as to avoid local buffer overflow: The tail drop is a method of reducing congestion by discarding a data packet. For example, a switching node directly discards a newly received data packet when a buffer is full.

However, although the foregoing several ways can reduce congestion to some extent, effect is not desirable. In addition, exchange efficiency of the data exchange network is affected, and an exchange delay is increased.

SUMMARY

This application provides a data exchange method and apparatus, to resolve problems in a conventional technology that exchange efficiency of a data exchange network is low and an exchange delay is long.

To achieve the foregoing objectives, the following technical solutions are used in this application.

According to a first aspect, a data exchange method is provided. The method includes: A source node receives flow indication information from a first switching node, where the flow indication information indicates that congestion occurs in a target data flow; and the first switching node is a node in a switching path of the target data flow: The source node sends multiple pieces of write data information and multiple data blocks of the target data flow to multiple switching nodes, where the multiple pieces of write data information indicate the multiple switching nodes to store the multiple data blocks and stop forwarding the multiple data blocks.

In the foregoing technical solution, when the first switching node determines that congestion occurs in or is about to occur in the target data flow; the first switching node may notify the source node. In this way, the source node may store the multiple data blocks of the target data flow in the multiple switching nodes respectively. To be specific, the source node may store the multiple data blocks in a larger-capacity buffer pool including the multiple switching nodes, so that a larger buffer can be provided, congestion of the target data flow can be reduced, head-of-line blocking is avoided, and a capability of absorbing burst traffic is improved, thereby improving data exchange efficiency and reducing an exchange delay.

In an embodiment of the first aspect, after the source node sends the multiple pieces of write data information and the multiple data blocks of the target data flow to the multiple switching nodes, the method further includes: The source node receives multiple pieces of block description information from the multiple switching nodes, where the multiple pieces of block description information one-to-one correspond to the multiple data blocks, and each piece of block description information indicates information about a node that stores a corresponding data block, for example, an identifier of a node that stores a data block and a storage address of the data block. The source node sends the multiple pieces of block description information to a destination node. Optionally, the block description information further indicates an identifier of a data packet included in a corresponding data block. Alternatively, the source node sends, to the destination node, an identifier of a data packet included in each of the multiple data blocks. In the foregoing embodiment, when the source node stores the multiple data blocks of the target data flow in the multiple switching nodes respectively, the multiple switching nodes may return block description information of corresponding stored data blocks to the source node, so that the source node sends the multiple block description information to the destination node. In this way, the destination node may sequentially schedule the multiple data blocks based on the multiple pieces of block description information.

In an embodiment of the first aspect, before the source node sends the multiple pieces of write data information and the multiple data blocks of the target data flow to the multiple switching nodes, the method further includes: The source node divides to-be-exchanged data in the target data flow into the multiple data blocks, where a quantity of the multiple data blocks is greater than or equal to a quantity of the multiple switching nodes. In the foregoing embodiment, the source node may divide the to-be-exchanged data in the target data flow into the multiple data blocks depending on an actual situation, so as to store the data blocks in a distributed manner in the multiple switching nodes.

In an embodiment of the first aspect, a ranking of a data block corresponding to one switching node in the multiple switching nodes in the multiple data blocks is consistent with a ranking of a distance corresponding to the switching node in multiple distances arranged in ascending order, the distance corresponding to the switching node is a distance between the switching node and the first switching node, and the multiple distances include distances between all of the multiple switching nodes and the first switching node. In the foregoing embodiment, paths for scheduling the multiple data blocks by the destination node can be reduced, so as to improve efficiency of scheduling the multiple data blocks by the destination node.

According to a second aspect, a data exchange method is provided. The method includes: A switching node sends flow indication information to a source node, where the flow indication information indicates that congestion occurs in a target data flow, and the switching node is a node in a switching path of the target data flow: The switching node receives write data information and a data block of the target data flow from the source node, where the write data information indicates the switching node to store the data block and stop forwarding the data block. The switching node stores the data block based on the write data information. The switching node receives scheduling information from a destination node, where the scheduling information is used to schedule the data block. The switching node sends the data block to the destination node.

In the foregoing technical solution, when the switching node determines that congestion occurs in or is about to occur in the target data flow: the switching node may notify the source node. In this way, the source node may store multiple data blocks of the target data flow in multiple switching nodes respectively. To be specific, the source node may store the multiple data blocks in a larger-capacity buffer pool including the multiple switching nodes, so that a larger buffer can be provided, congestion of the target data flow can be reduced, head-of-line blocking is avoided, and a capability of absorbing burst traffic is improved, thereby improving data exchange efficiency and reducing an exchange delay.

In an embodiment of the second aspect, after the switching node stores the data block based on the write data information, the method further includes: The switching node sends block description information of the data block to the destination node: or the switching node sends block description information of the data block to the source node. The block description information indicates information about a node that stores the data block. Optionally, the block description information further indicates an identifier of a data packet included in a corresponding data block. In the foregoing embodiment, when the source node stores the multiple data blocks of the target data flow in the multiple switching nodes respectively, each switching node in the multiple switching nodes may return block description information of a corresponding stored data block to the source node or the destination node. In this way, the destination node may sequentially schedule the multiple data blocks based on multiple pieces of block description information.

According to a third aspect, a data exchange method is provided. The method includes: A first switching node sends flow indication information to a source node, where the flow indication information indicates that congestion occurs in a target data flow; and the first switching node is a node in a switching path of the target data flow: When the flow indication information is received, the source node sends multiple pieces of write data information and multiple data blocks of the target data flow to multiple switching nodes, where the multiple pieces of write data information indicate the multiple switching nodes to store the multiple data blocks and stop forwarding the multiple data blocks. The multiple switching nodes receive the multiple pieces of write data information and the multiple data blocks, and store the multiple data blocks based on the multiple pieces of write data information. A destination node sends multiple pieces of scheduling information to the multiple switching nodes, where the multiple pieces of scheduling information are used to schedule the multiple data blocks. The multiple switching nodes receive the multiple pieces of scheduling information, and send the multiple data blocks to the destination node based on the multiple pieces of scheduling information.

In the foregoing technical solution, when congestion occurs in or is about to occur in the target data flow in the first switching node, the first switching node may notify the source node. In this way, the source node may store the multiple data blocks of the target data flow in the multiple switching nodes respectively. To be specific, the source node may store the multiple data blocks in a larger-capacity buffer pool including the multiple switching nodes, so that the destination node can schedule a corresponding data block from the multiple switching nodes. Therefore, a data exchange network can provide a larger buffer, reduce congestion of the target data flow: avoid head-of-line blocking, and improve a capability of absorbing burst traffic, thereby improving data exchange efficiency and reducing an exchange delay.

In an embodiment of the third aspect, the method further includes: The multiple switching nodes send multiple pieces of block description information to the source node, where the multiple pieces of block description information one-to-one correspond to the multiple data blocks, and each piece of block description information indicates information about a node that stores a corresponding data block. The source node receives the multiple pieces of block description information, and sends the multiple pieces of block description information to the destination node. Alternatively, the multiple switching nodes send multiple pieces of block description information to the destination node, where each piece of block description information indicates information about a node that stores a corresponding data block. In the foregoing embodiment, when the source node stores the multiple data blocks of the target data flow in the multiple switching nodes respectively, the multiple switching nodes may return block description information of corresponding stored data blocks to the source node or the destination node. In this way, the destination node may sequentially schedule the multiple data blocks based on the multiple pieces of block description information.

In an embodiment of the third aspect, before the destination node sends the multiple pieces of scheduling information to the multiple switching nodes, the method further includes: When the multiple pieces of block description information are received, the destination node determines a scheduling sequence of the multiple data blocks based on the multiple pieces of block description information. The scheduling sequence is used to schedule the multiple data blocks from the multiple switching nodes. In the foregoing embodiment, the destination node may sequentially schedule the multiple data blocks based on the multiple pieces of block description information or storage indication information.

In an embodiment of the third aspect, the method further includes: The source node divides to-be-exchanged data in the target data flow into the multiple data blocks, where a quantity of the multiple data blocks is greater than or equal to a quantity of the multiple switching nodes. In the foregoing embodiment, the source node may divide the to-beexchanged data in the target data flow into the multiple data blocks depending on an actual situation, so as to store the data blocks in a distributed manner in the multiple switching nodes.

In an embodiment of the third aspect, a ranking of a data block correspondingly stored in one switching node in the multiple switching nodes in the multiple data blocks is consistent with a ranking of a distance corresponding to the switching node in multiple distances arranged in ascending order, the distance corresponding to the switching node is a distance between the switching node and the first switching node, and the multiple distances include distances between the multiple switching nodes and the first switching node. In the foregoing embodiment, paths for scheduling the multiple data blocks by the destination node can be reduced, so as to improve efficiency of scheduling the multiple data blocks by the destination node.

According to a fourth aspect, a data exchange apparatus is provided. The apparatus serves as a source node, and includes: a receiving unit, configured to receive flow indication information from a first switching node, where the flow indication information indicates that congestion occurs in a target data flow; and the first switching node is a node in a switching path of the target data flow; and a sending unit, configured to send multiple pieces of write data information and multiple data blocks of the target data flow to multiple switching nodes, where the multiple pieces of write data information indicate the multiple switching nodes to store the multiple data blocks and stop forwarding the multiple data blocks.

In an embodiment of the fourth aspect, the receiving unit is further configured to receive multiple pieces of block description information from the multiple switching nodes, where the multiple pieces of block description information one-to-one correspond to the multiple data blocks, and each piece of block description information indicates information about a node that stores a corresponding data block. The sending unit is further configured to send the multiple pieces of block description information to a destination node.

In an embodiment of the fourth aspect, the apparatus further includes a processing unit, configured to divide to-be-exchanged data in the target data flow into the multiple data blocks, where a quantity of the multiple data blocks is greater than or equal to a quantity of the multiple switching nodes.

In an embodiment of the fourth aspect, a ranking of a data block corresponding to one switching node in the multiple switching nodes in the multiple data blocks is consistent with a ranking of a distance corresponding to the switching node in multiple distances arranged in ascending order, the distance corresponding to the switching node is a distance between the switching node and the first switching node, and the multiple distances include distances between all of the multiple switching nodes and the first switching node.

According to a fifth aspect, a data exchange apparatus is provided. The apparatus serves as a switching node, and includes: a sending unit, configured to send flow indication information to a source node, where the flow indication information indicates that congestion occurs in a target data flow; and the switching node is a node in a switching path of the target data flow: a receiving unit, configured to receive write data information and a data block of the target data flow from the source node, where the write data information indicates the switching node to store the data block and stop forwarding the data block; and a processing unit, configured to store the data block based on the write data information. The receiving unit is further configured to receive scheduling information from a destination node, where the scheduling information is used to schedule the data block. The sending unit is further configured to send the data block to the destination node.

In an embodiment of the fifth aspect, the sending unit is further configured to: send block description information of the data block to the destination node: or send the block description information of the data block to the source node. The block description information indicates information about a node that stores the data block.

According to a sixth aspect, a data exchange network is provided. The data exchange network includes a source node, multiple switching nodes, and a destination node, and the multiple switching nodes include a first switching node. The first switching node is configured to send flow indication information to the source node, where the flow indication information indicates that congestion occurs in a target data flow; and the first switching node is a node in a switching path of the target data flow: The source node is configured to: receive the flow indication information, and send multiple pieces of write data information and multiple data blocks of the target data flow to the multiple switching nodes, where the multiple pieces of write data information indicate the multiple switching nodes to store the multiple data blocks and stop forwarding the multiple data blocks. The multiple switching nodes are configured to: receive the multiple pieces of write data information and the multiple data blocks, and store the multiple data blocks based on the multiple pieces of write data information. The destination node is configured to send multiple pieces of scheduling information to the multiple switching nodes, where the multiple pieces of scheduling information are used to schedule the multiple data blocks. The multiple switching nodes are further configured to: receive the multiple pieces of scheduling information, and send the multiple data blocks to the destination node based on the multiple pieces of scheduling information.

In an embodiment of the sixth aspect, the multiple switching nodes are further configured to send multiple pieces of block description information to the source node, where the multiple pieces of block description information one-to-one correspond to the multiple data blocks, and each piece of block description information indicates information about a node that stores a corresponding data block. The source node is further configured to: receive the multiple pieces of block description information, and send the multiple pieces of block description information to the destination node.

In an embodiment of the sixth aspect, the multiple switching nodes are further configured to send the multiple pieces of block description information to the destination node.

In an embodiment of the sixth aspect, the destination node is further configured to: receive the multiple pieces of block description information, and determine a scheduling sequence of the multiple data blocks based on the multiple pieces of block description information, where the scheduling sequence is used to schedule the multiple data blocks from the multiple switching nodes.

In an embodiment of the sixth aspect, the source node is further configured to divide to-be-exchanged data in the target data flow into the multiple data blocks, where a quantity of the multiple data blocks is greater than or equal to a quantity of the multiple switching nodes.

In an embodiment of the sixth aspect, a ranking of a data block correspondingly stored in one switching node in the multiple switching nodes in the multiple data blocks is consistent with a ranking of a distance corresponding to the switching node in multiple distances arranged in ascending order, the distance corresponding to the switching node is a distance between the switching node and the first switching node, and the multiple distances include distances between the multiple switching nodes and the first switching node.

According to still another aspect of this application, a data exchange apparatus is provided. The data exchange apparatus includes a processor, a memory, a communication interface, and a bus. The processor, the memory, and the communication interface are connected through the bus. The memory is configured to store program code. When the program code is executed by the processor, the data exchange apparatus is enabled to perform the data exchange method according to any one of the first aspect or the embodiments of the first aspect.

According to still another aspect of this application, a data exchange apparatus is provided. The data exchange apparatus includes a processor, a memory, a communication interface, and a bus. The processor, the memory, and the communication interface are connected through the bus. The memory is configured to store program code. When the program code is executed by the processor, the data exchange apparatus is enabled to perform the data exchange method according to any one of the second aspect or the embodiments of the second aspect.

According to still another aspect of this application, a data exchange apparatus is provided. The data exchange apparatus includes a processor, a memory, a communication interface, and a bus. The processor, the memory, and the communication interface are connected through the bus. The memory is configured to store program code. When the program code is executed by the processor, the data exchange apparatus is enabled to perform the data exchange method according to any one of the third aspect or the embodiments of the third aspect.

In still another aspect of this application, a computer-readable storage medium is provided. The computer-readable storage medium stores a computer program or instructions. When the computer program or instructions are run, the data exchange method according to the first aspect or the embodiments of the first aspect is implemented.

In still another aspect of this application, a computer-readable storage medium is provided. The computer-readable storage medium stores a computer program or instructions. When the computer program or instructions are run, the data exchange method according to any one of the second aspect or the embodiments of the second aspect is implemented.

In still another aspect of this application, a computer-readable storage medium is provided. The computer-readable storage medium stores a computer program or instructions. When the computer program or instructions are run, the data exchange method according to any one of the third aspect or the embodiments of the third aspect is implemented.

In still another aspect of this application, a computer program product is provided. The computer program product includes a computer program or instructions. When the computer program or instructions are run, the data exchange method according to any one of the first aspect or the embodiments of the first aspect is performed.

In still another aspect of this application, a computer program product is provided. The computer program product includes a computer program or instructions. When the computer program or instructions are run, the data exchange method according to any one of the second aspect or the embodiments of the second aspect is performed.

In still another aspect of this application, a computer program product is provided. The computer program product includes a computer program or instructions. When the computer program or instructions are run, the data exchange method according to any one of the third aspect or the embodiments of the third aspect is performed.

It may be understood that the apparatuses, the data exchange network, the computer storage media, or the computer program products for any data exchange method provided above are all configured to perform the corresponding method provided above. Therefore, for beneficial effects that can be achieved by the apparatuses, the data exchange network, the computer storage media, or the computer program products, refer to the beneficial effects in the corresponding method provided above. Details are not described herein again.

DESCRIPTION OF EMBODIMENTS

The following describes the technical solutions in embodiments of this application with reference to the accompanying drawings in embodiments of this application. In this application, "at least one" refers to one or more, and "multiple" refers to two or more. "And/Or" describes an association relationship between associated objects, and indicates that three relationships may exist. For example, A and/or B may indicate the following cases: Only A exists, both A and B exist, and only B exists, where A and B may be singular or plural. The character "/" generally indicates an "or" relationship between the associated objects. "At least one of the following items (pieces)" or a similar expression thereof refers to any combination of these items, including a single item (piece) or any combination of multiple items (pieces). For example, at least one item (piece) of a, b, or c may indicate: a, b, c, a and b, a and c, b and c, or a, b, and c, where a, b, and c may be singular or plural. In addition, in embodiments of this application, terms such as "first" and "second" do not limit a quantity or an order.

It should be noted that, in this application, the term such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the term such as "example" or "for example" is intended to present a related concept in a specific manner.

The technical solutions provided in this application may be applied to multiple different data exchange networks. The data exchange network may be a large-scale data exchange network or a small-scale data exchange network. The small-scale data exchange network may also be referred to as a data exchange system. The data exchange network may include multiple switching nodes, and the switching nodes may also be referred to as nodes. In actual application, the switching node may be a switching device such as a switch or a router, or may be a switch board, a switch element (SE), or the like. The switch board may also be referred to as a switch network interface card or a network interface card (NIC), and one switch board may include one or more switch elements. Optionally, the data exchange network may include a data center network (DCN), a high performance computing (HPC) network, a cloud network, a network-on-chip obtained by packaging a single chip or multiple chip, and the like.

Figure 1:
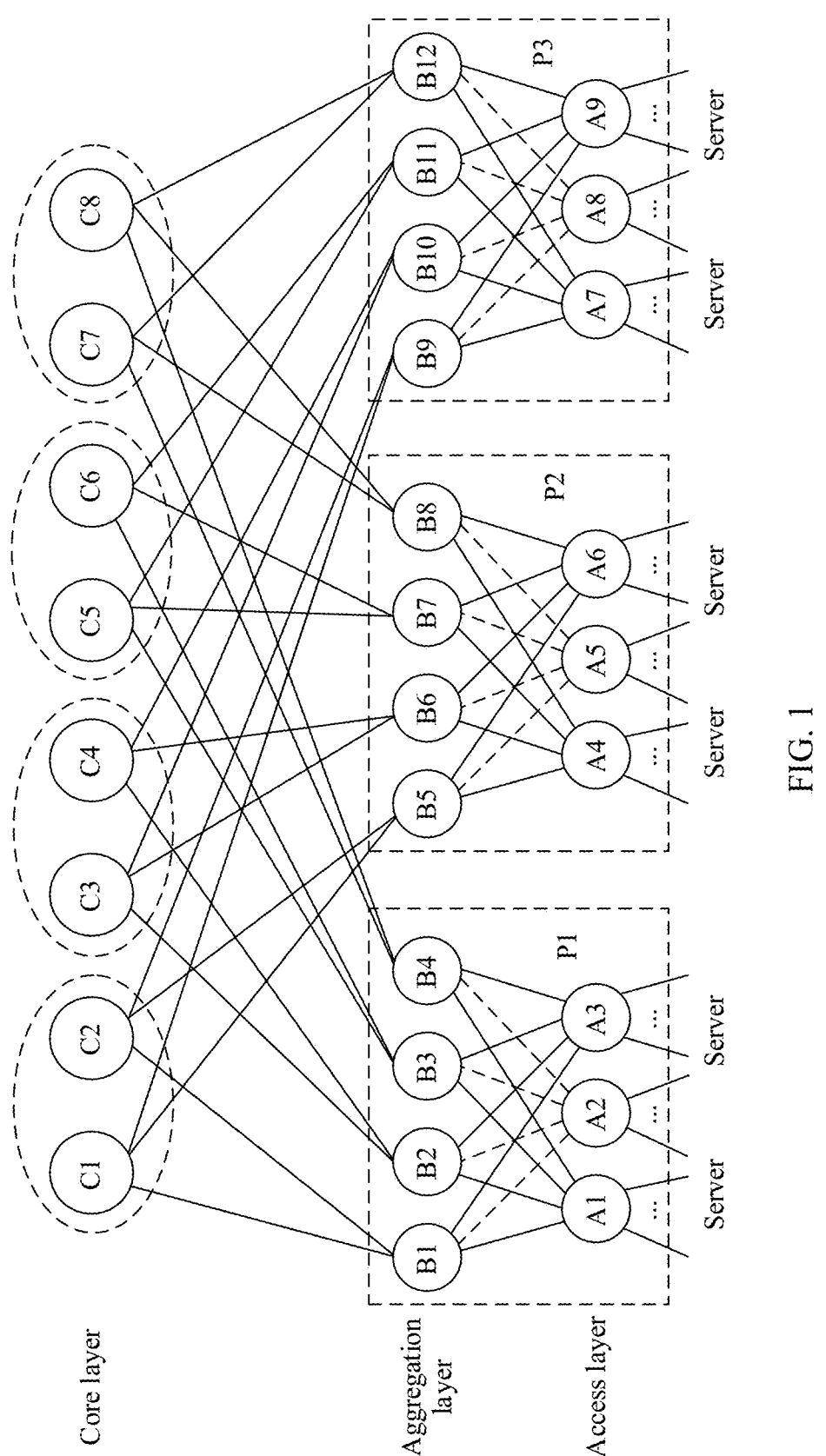
FIG. 1 is a diagram of a structure of a data exchange network according to an embodiment of this application.
Figure 2:
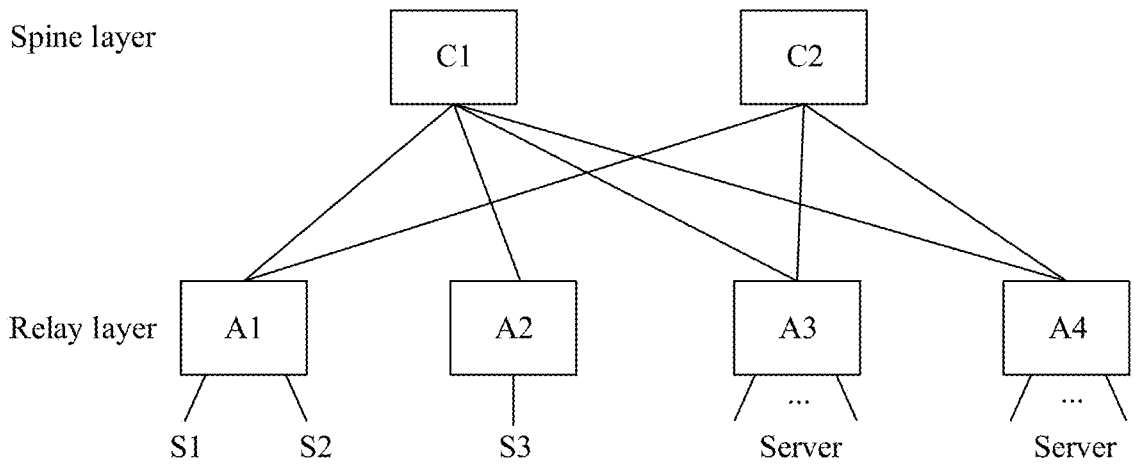
FIG. 2 is a diagram of a structure of another data exchange network according to an embodiment of this application.
Figure 3:
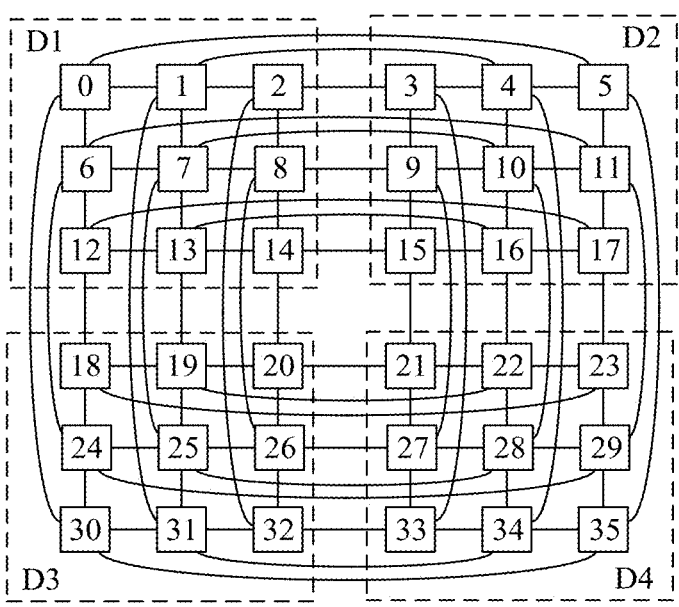
FIG. 3 is a diagram of a structure of still another data exchange network according to an embodiment of this application.

The following describes a structure of the data exchange network by using FIG. 1 to FIG. 3 as examples.

FIG. 1 is a diagram of a structure of a data exchange network according to an embodiment of this application. The data exchange network includes three switching layers. Refer to FIG. 1. The data exchange network includes an access layer, an aggregation layer, and a core layer. The access layer includes multiple access nodes, the aggregation layer includes multiple aggregation nodes, and the core layer includes multiple core nodes. In addition, downlink ports of the access nodes are connected to servers that need to exchange data traffic, uplink ports of the access nodes are connected to downlink ports of the aggregation nodes, and uplink ports of the aggregation nodes are connected to the core nodes.

The aggregation layer and the access layer may be divided into multiple pods (pods), one pod may include multiple access nodes and multiple aggregation nodes, and each access node is fully connected to the multiple aggregation nodes. Multiple core nodes connected to a same aggregation node may be referred to as a core plane, and core planes are connected to different aggregation nodes in the pods respectively. In FIG. 1, an example in which the data exchange network includes three pods, one pod includes three access nodes and four aggregation nodes, and each core plane includes two core nodes is merely used for description. In FIG. 1, the access nodes may be indicated by A1 to A9, the aggregation nodes may be indicated by B1 to B12, the core nodes may be indicated by C1 to C8, and the three pods are indicated by P1 to P3 respectively.

When data traffic is exchanged between servers connected to different access nodes in one pod, the data traffic may be exchanged via an aggregation node that is in a same pod as the access nodes. For example, if a server connected to the access node A1 and a server connected to the access node A3 need to exchange data traffic, the access node A1 may send, to the access node A3 via the aggregation node B1, a data flow from the server connected to the access node A1. When data traffic is exchanged between servers connected to access nodes in different pods, the data traffic may be exchanged via aggregation nodes in same pods as the access nodes and a core node connected to the aggregation nodes. For example, if a server connected to the access node A1 and a server connected to the access node A5 need to exchange data traffic, the access node A1 may send a data flow from the server connected to the access node A1 to the aggregation node B1, the aggregation node B1 forwards the data flow to the core node C1, and then C1 sends the data flow to the access node A5 via the aggregation node B5.

FIG. 2 is a diagram of a structure of another data exchange network according to an embodiment of this application. The data exchange network includes two switching layers. Refer to FIG. 2. The data exchange network includes a relay layer (which may also be referred to as a TOR layer) and a spine layer. The relay layer includes multiple leaf nodes, and the spine layer includes multiple spine nodes. In addition, downlink ports of the leaf nodes are connected to servers that need to exchange data traffic, and uplink ports of the leaf nodes are connected to the multiple spine nodes. In FIG. 2, an example in which the data exchange network includes four leaf nodes and two spine nodes is merely used for description. In FIG. 2, the leaf nodes may be indicated by A1 to A4, and the spine nodes may be indicated by C1 and C2.

When data traffic is exchanged between two servers connected to a same leaf node, the data traffic may be exchanged via the leaf node. For example, two servers (for example, S1 and S2) connected to the leaf node A1 may exchange data traffic via the leaf node A1. When data traffic is exchanged between two servers connected to different leaf nodes, the data traffic may be exchanged via the leaf nodes and a spine node. For example, when a server S1 connected to the leaf node A1 needs to exchange data traffic with a server S3 connected to the leaf node A2, the leaf node A1 may send a data flow from the server S1 to the spine node C1, and the spine node C1 forwards the data flow to the leaf node A2.

FIG. 3 is a diagram of a structure of still another data exchange network according to an embodiment of this application. The data exchange network may be a network-on-chip. Refer to FIG. 3. The data exchange network includes multiple switching chips, each of the multiple switching chips includes multiple switch elements, and all switch elements in the data exchange network may be interconnected in a specific manner. In FIG. 3, an example in which the data exchange network includes four switching chips D1 to D4, each switching chip includes nine switch elements, and switch elements in the data exchange network are indicated by 1 to 35 respectively is used for description.

Each switch element may have one or more input ports and one or more output ports. The input interface may be configured to receive an externally input data packet or cell, and the output port may be configured to output a data packet or cell to the outside. Interconnection between the multiple switch elements in the data exchange network may be used to switch a data packet or cell received through each input interface to a corresponding output port. Each switch element in the data exchange network may include at least one buffer queue (queue), and the at least one buffer queue may be used to buffer different data packets or cells destined for different output ports. An interconnection relationship between the multiple switch elements shown in FIG. 3 is merely an example, and constitutes no limitation on embodiments of this application.

In the foregoing data exchange networks, each switching node has a specific switching capability and a buffer with a specific capacity. When to-be-scheduled traffic of a switching node exceeds a switching capability and a buffer capability of the switching node, phenomena such as head-of-line blocking and packet loss are caused. As a result, exchange efficiency of the data exchange network is affected, and an exchange delay is increased. Therefore, how to reduce congestion in a data exchange network is a technical problem that needs to be resolved urgently at present.

Figure 4:
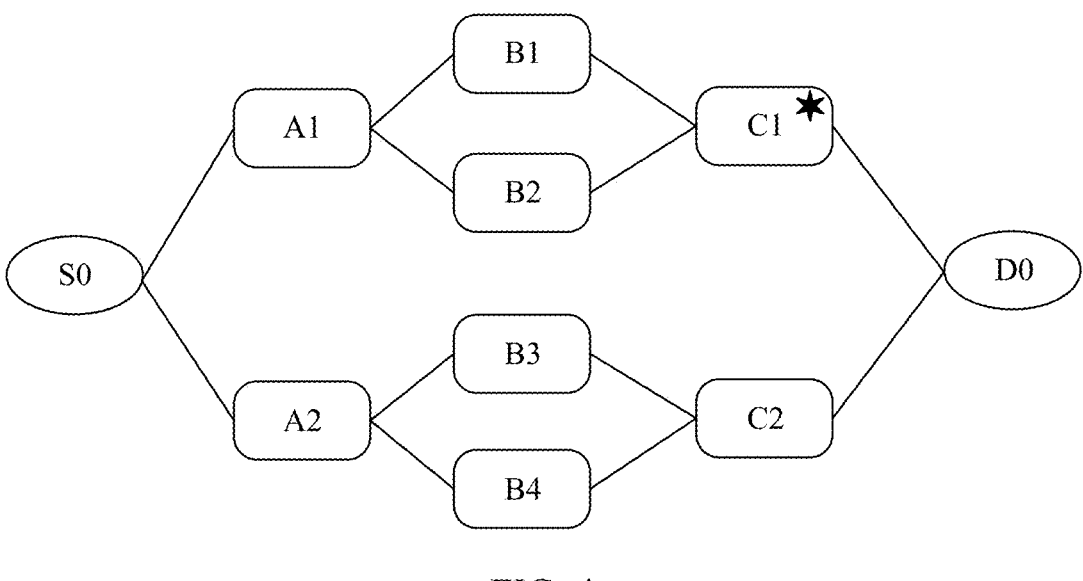
FIG. 4 is a diagram of data flow congestion in a data exchange network according to an embodiment of this application.

For example. FIG. 4 is a diagram of data exchange between a source server S0 and a target server D0 over a data exchange network. In FIG. 4, an example in which the data exchange network includes multiple switching nodes that are indicated by A1 and A2. B1 to B4, and C1 and C2 respectively, the source server S0 is separately interconnected with A1 and A2, the destination server D0 is separately interconnected with C1 and C2. A1 is interconnected with C1 separately through B1 and B2, and A2 is interconnected with C2 separately through B3 and B4 is used for description. In the data exchange process, if congestion occurs in a switching node in the data exchange network, the data exchange network may use the following several different flow control manners to reduce the congestion.

First, a passive congestion control mechanism is used to reduce the congestion. Specifically, if the congestion occurs in C1, C1 may indicate, in an explicit congestion notification (ECN) manner, the source server S0 to reduce a sending rate, or separately indicate, in a priority-based flow control (PFC) manner. B1 and B2 to stop sending data, or discard a newly received data packet in a tail drop manner. In actual application, for different data flows (which may be distinguished based on a priority, a port, and the like), different flow control manners are used. For example, for a high-priority data flow of a service, the ECN manner and the PFC manner may be used. For a low-priority data flow of a service, the ECN manner and the tail drop manner may be used.

However, due to factors such as a technology and costs, a buffer capacity of a single switching node is limited and cannot be infinitely increased. As a result, congestion is still caused when a data amount is large. In addition, an increase rate of the buffer capacity is far less than increase of a port bandwidth. As a result, a capability of a single switching node to bear burst traffic is weakened. Moreover, flow control generated by a switching node may spread throughout the data exchange network, which further leads to a head-of-line blocking problem.

Second, an active congestion control mechanism is used to reduce the congestion. Specifically, the source server S0 may actively obtain information such as a link status or a rate by using active probe means such as a probe packet and a local flow table (for example, when the congestion occurs in C1, C1 may return a probe result including the information to the source server S0). The source server S0 directly controls a sending rate of a local data flow based on the information. Because the probe packet and the local flow table need to occupy a specific bandwidth and a specific buffer, the active congestion control mechanism is applicable only to a small-scale data exchange network. A quantity of data flows in a large-scale data exchange network is very large, which increases implementation difficulty. In addition, the active congestion control mechanism cannot control a burst of a large quantity of data flows with small data amounts. Therefore, an application scope of the active congestion control mechanism is limited.

Third, an adaptive path control mechanism is used to reduce the congestion. Specifically, when the source server S0 exchanges a data flow with the destination server D0 via A1, B1, and C1, if congestion occurs in a data flow f at C1, C1 may indicate an upstream node to switch the data flow f to another available path (for example, C1 indicates the source server S0 to switch the data flow f to a path in which A2, B4, and C2 are located). An essence of the adaptive path control mechanism is to make full use of a bandwidth of an available path in a lightly loaded network, so as to improve bandwidth utilization. The adaptive path control mechanism is generally applicable to an HPC scenario or a scenario in which network convergence is performed, and is not applicable to a scenario in which congestion occurs in a destination end.

In view of this, embodiments of this application provide a data exchange method, so that when congestion occurs in a data flow at a switching node, buffers of multiple different switching nodes in a data exchange network can be fully utilized to store data of the data flow; so as to reduce the congestion, improve exchange efficiency of the data exchange network, and reduce an exchange delay. To be specific, in embodiments of this application, buffers of all nodes in the data exchange network may be pooled, that is, the buffers of all the nodes in the network may be virtualized into a large-capacity buffer pool that is presented to a user, so as to implement a virtual large buffer capability and improve a capability of absorbing burst traffic. In addition, each node may include a data plane and a control plane. The data plane is for transmission of data, and the control plane is for transmission of control signaling, so as to implement data and signaling transmission between different nodes.

The following describes the data exchange method provided in embodiments of this application.

Figure 5:
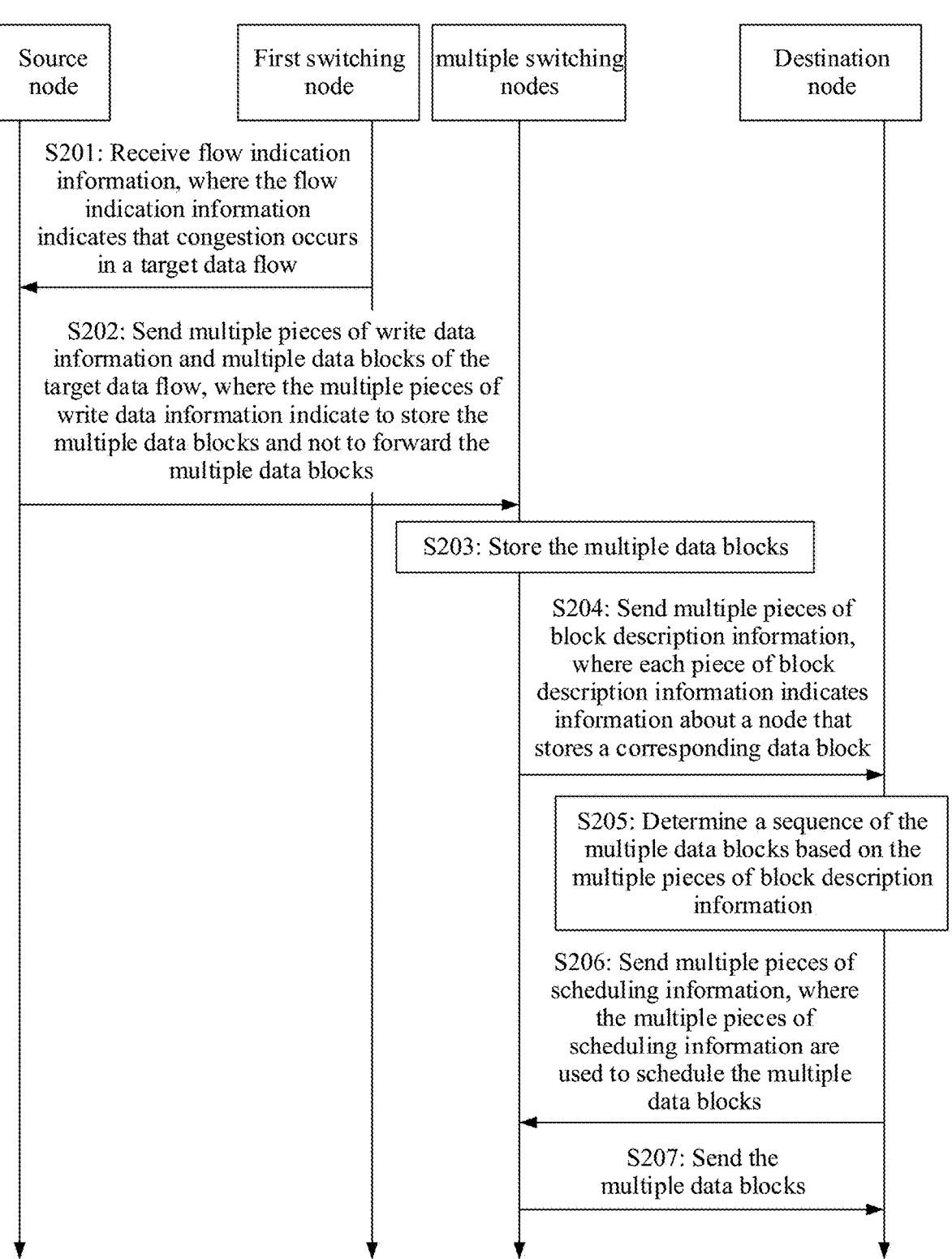
FIG. 5 is a schematic flowchart of a data exchange method according to an embodiment of this application.
Figure 6:
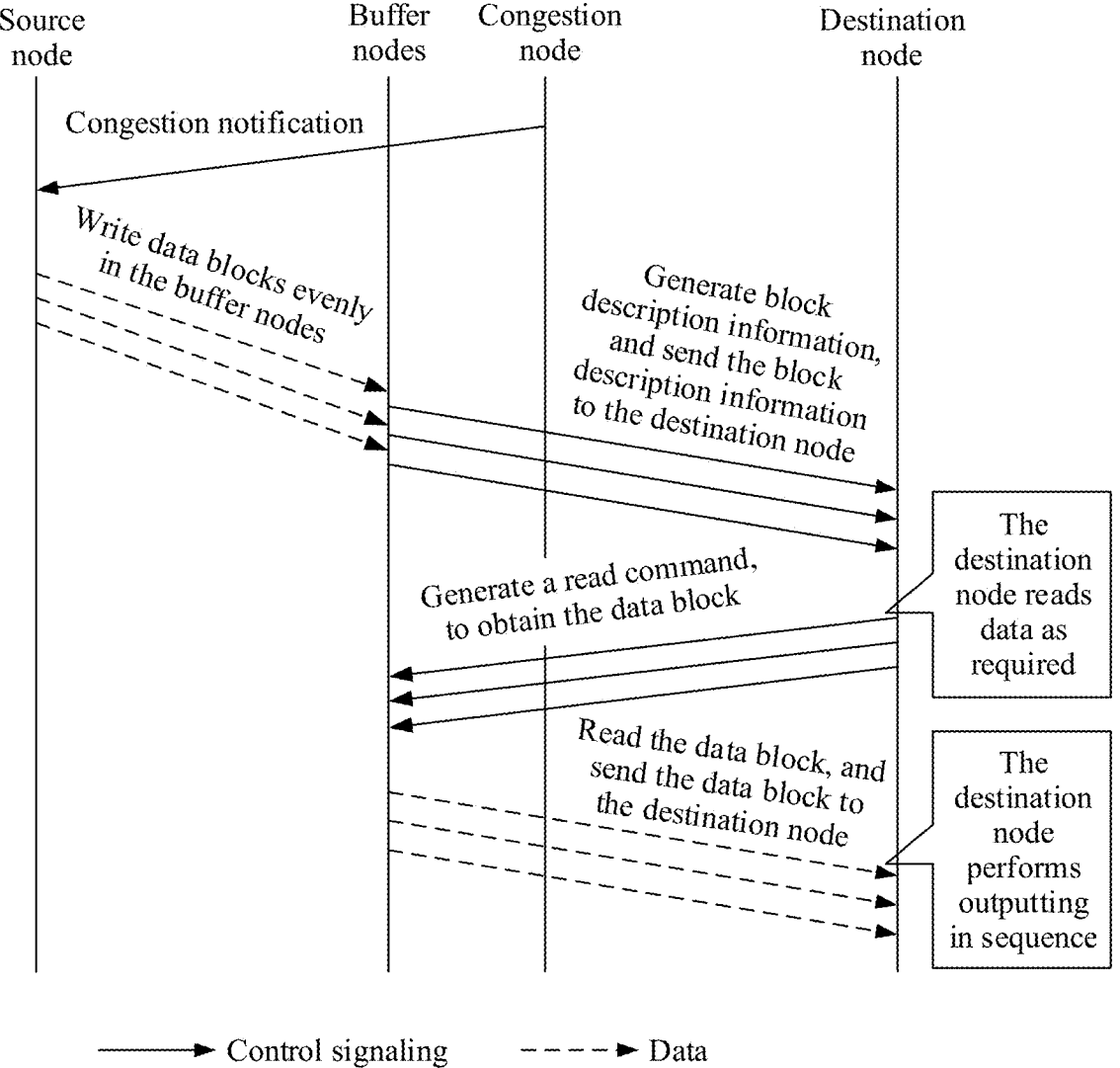
FIG. 6 is a schematic flowchart of another data exchange method according to an embodiment of this application.

FIG. 5 is a schematic flowchart of a data exchange method according to an embodiment of this application. The method may be applied to any data exchange network provided above. The method includes the following steps. FIG. 6 shows an example in which the data exchange method is applied to a data exchange network.

S201: A source node receives flow indication information from a first switching node, where the flow indication information indicates that congestion occurs in a target data flow:

The source node may be a source server of the target data flow, or may be a switching node accessed by the source server in the data exchange network. Similarly, a destination node in the following description may be a destination server of the target data flow; or may be a switching node accessed by the destination server in the data exchange network.

In addition, the first switching node may be any switching node in a switching path in which the target data flow is located in the data exchange network. The target data flow may be a data flow in which congestion occurs or is about to occur in the first switching node. In other words, the target data flow may be a data flow determined by the first switching node. The first switching node is represented as a congestion node in FIG. 6. The flow indication information may include a flow identifier of the target data flow: Optionally, a congestion notification may carry the flow indication information.

In addition, the first switching node may determine, based on one or more of parameters such as a transmission rate, a real-time queue length, a queue scheduling priority, and a buffer usage status of the target data flow in the first switching node, that congestion occurs in the target data flow. For example, if the real-time queue length of the target data flow in the first switching node is greater than a preset length, or the buffer usage status is greater than a preset occupation rate, the first switching node may determine that the target data flow is a congestion flow: It should be noted that, for a specific process in which the first switching node determines that congestion occurs in the target data flow: refer to the descriptions in a conventional technology. This is not specifically limited in embodiments of this application.

For example, when the source node switches the target data flow over the data exchange network, if the first switching node in the switching path in which the target data flow is located determines that congestion occurs in the target data flow: the first switching node may send, to the source node, flow indication information indicating the target data flow, so that the source node receives the flow indication information. When the first switching node is interconnected with the source node, the first switching node may directly send the flow indication information to the source node. When the first switching node is interconnected with the source node via another switching node, the first switching node may send the flow indication information to the source node via the another switching node.

Figure 7:
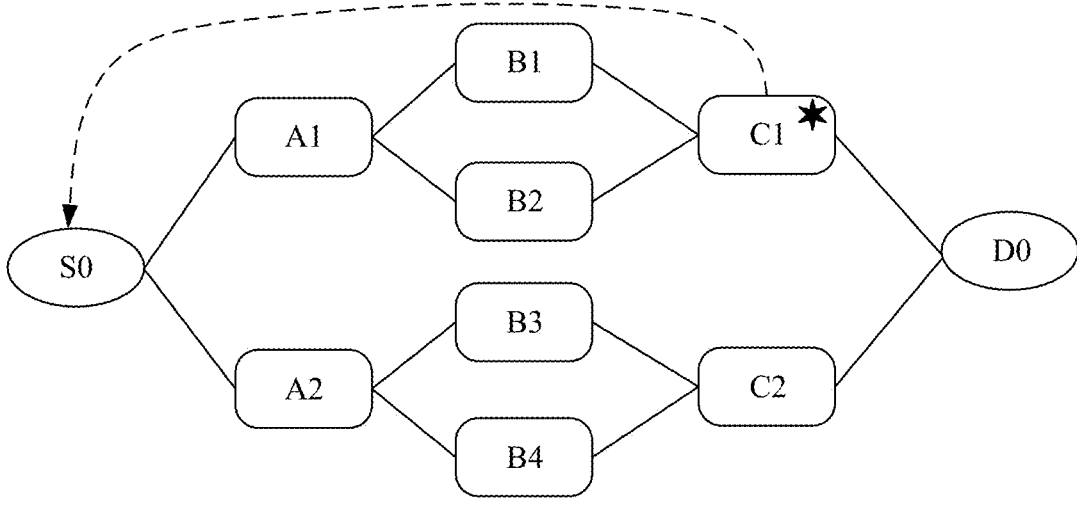
FIG. 7 is a diagram of sending a congestion notification according to an embodiment of this application.

The data exchange network shown in FIG. 4 is used as an example. If the source node is the source server S0, the switching path in which the target data flow is located is S0-A1-B1-C1-D0, and the first switching node is C1, as shown in FIG. 7, when determining that the target data flow f is a congestion flow: the switching node C1 may send a congestion notification to the source server S0. A specific process may be as follows: The switching node C1 sends, to the switching node B1, a congestion notification indicating the target data flow f, the switching node B1 forwards the received congestion notification to the switching node A1, and the switching node A1 forwards the congestion notification to the source server S0, so that the source server S0 receives the congestion notification.

Optionally, information transmission between any two nodes in the data exchange network (for example, between a server and a switching node, or between switching nodes) may include a control plane and a data plane. The control plane is for transmission of control signaling, and the data plane is for transmission of data. The control signaling may include the flow indication information and the congestion notification, or may include block description information, storage indication information, scheduling information, and the like in the following description. The data transmitted on the data plane may include a cell, a data packet, a data block (DB), and the like.

S202: The source node sends multiple pieces of write data information and multiple data blocks of the target data flow to multiple switching nodes, where the multiple pieces of write data information indicate the multiple switching nodes to store the multiple data blocks and stop forwarding the multiple data blocks.

The multiple switching nodes (which may also be referred to as buffer nodes) may include some switching nodes in the data exchange network, or may include all switching nodes in the data exchange network. The multiple switching nodes may include the first switching node, or may not include the first switching node. In FIG. 6, the multiple switching nodes are represented as buffer nodes, and an example in which the multiple switching nodes do not include the first switching node (namely, a congestion node) is used for description.

In addition, each of the multiple data blocks may include a specific quantity of cells or data packets. Quantities of cells or data packets included in different data blocks in the multiple data blocks may be the same or different. Lengths of different data blocks may be the same or different. In other words, the multiple data blocks may be fixed-length data blocks or variable-length data blocks.

Further, each piece of write data information may indicate a corresponding switching node to store at least one of the multiple data blocks. To be specific, the source node may send one or more data blocks to one switching node. An example in which the source node sends one data block to one switching node is used for description below. Optionally, the write data information may include a data block identifier and a write data identifier. The data block identifier may identify a data block, and may indicate a location of the data block in the multiple data blocks. For example, the data block identifier may be a sequence number of the data block. The write data identifier may indicate a switching node that receives the write data identifier to locally store a data block and stop forwarding the data block.

It should be noted that stopping forwarding the data block may mean that when a switching node that receives the data block fails to receive scheduling information used to schedule the data block, the switching node does not send the data block to a lower-level node. In other words, the switching node can send the data block to the lower-level node only after receiving the scheduling information used to schedule the data block.

Optionally, the multiple data blocks may be obtained by dividing to-be-exchanged data in the target data flow by the source node, and the to-be-exchanged data may be data that is stored in the source node, that is of the target data flow; and that is not sent. In an example, the source node may divide the to-be-exchanged data in the target data flow into the multiple data blocks, each of the multiple data blocks may correspond to one data block identifier, and a quantity of the multiple data blocks may be greater than or equal to a quantity of the multiple switching nodes.

For example, when the source node receives the flow indication information, the source node may divide the to-be-exchanged data in the target data flow indicated by the flow indication information into the multiple data blocks. For each of the multiple data blocks, the source node may send write data information and a data block to one switching node in the multiple switching nodes, to indicate, based on the write data information, the switching node to store the data block and stop forwarding the data block. Optionally, the source node may send the multiple data blocks to the multiple switching nodes in a load balancing manner.

For each switching node in the multiple switching nodes, when the source node is interconnected with the switching node, the source node may directly send the write data information to the switching node. When the source node is interconnected with the switching node via another switching node, the source node may send the write data information to the switching node via the another switching node.

Figure 8:
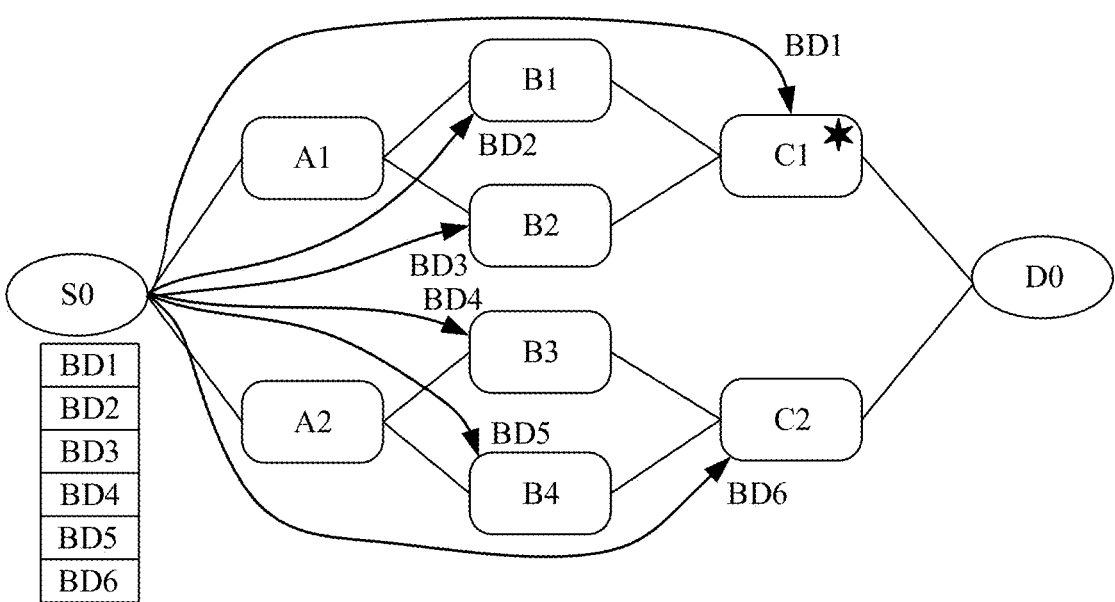
FIG. 8 is a diagram of storing multiple data blocks on multiple switching nodes according to an embodiment of this application.

The data exchange network shown in FIG. 4 is used as an example. If the source node is the source server S0, and the multiple switching nodes include B1 to B4, and C1 and C2, as shown in FIG. 8, the source server S0 may divide the to-be-exchanged data in the target data flow into six data blocks: DB1 to DB6, and send DB1 to DB6 to the multiple switching nodes according to the following method: sending DB1 and corresponding write data information to C1 via A1 and B1 (or B2), sending DB2 and corresponding write data information to B1 via A1, sending DB3 and corresponding write data information to B2 via A1, sending DB4 and corresponding write data information to B3 via A2, sending DB5 and corresponding write data information to B4 via A2, and sending DB6 and corresponding write data information to C2 via A2 and B3 (or B4). FIG. 8 shows only the data blocks sent by the source server S0.

Optionally, the write data information may further indicate an identifier (for example, a sequence number) of a data packet included in the data block. In an example, the write data information may include a sequence number of a first data packet and a sequence number of a last data packet in the data block. In another example, the data block identifier included in the write data information may be related to an identifier of a data packet included in the data block, so that the data block identifier may be used to determine the identifier of the data packet included in the data block.

S203: When the multiple switching nodes receive the multiple pieces of write data information and the multiple data blocks, the multiple switching nodes store the multiple data blocks.

For each switching node in the multiple switching nodes, when the switching node receives write data information and a data block in the multiple data blocks, the switching node may parse the write data information to obtain an identifier of the data block and a write data identifier, and determine, based on the write data identifier, that the data block needs to be stored, so that the switching node may locally store the data block, for example, store the data block in a buffer, and do not forward the data block to a lower-level switching node.

S204: The multiple switching nodes send multiple pieces of block description information to a destination node, where the multiple pieces of block description information one-to-one correspond to the multiple data blocks, and each piece of block description information indicates information about a node that stores a corresponding data block.

The block description information may indicate the switching node that stores the data block, or may indicate a storage address of the data block in the switching node. The storage address may be a physical address, a logical address, or the like. In an example, the block description information includes an identifier of the switching node and the storage address of the data block in the switching node. Further, the block description information may further include an identifier of the data block. Optionally, the block description information may further include an identifier of a data packet included in the data block.

For example, after the switching node stores the data block, the switching node may generate block description information corresponding to the data block based on information such as the identifier of the switching node, the identifier of the data block, and the storage address of the data block, and send the block description information to the destination node. When the switching node is interconnected with the destination node, the switching node may directly send the block description information to the destination node. When the switching node is interconnected with the destination node via another switching node, the switching node may send the block description information to the destination node via the another switching node.

Alternatively, after each switching node in the multiple switching nodes generates block description information, the switching node may send the block description information to the source node. After the source node receives the multiple pieces of block description information from the multiple switching nodes, the source node may send storage indication information to the destination node based on the multiple pieces of block description information. The storage indication information indicates information about a node that stores the multiple data blocks. The storage indication information may be determined by the source node based on the multiple pieces of block description information. The source node may include the multiple pieces of block description information directly in the storage indication information, or may process the block description information (for example, the source node may include an identifier of a data packet included in a corresponding data block in the block description information), and then sends storage indication information including processed block description information to the destination node.

Optionally, when the multiple switching nodes send the block description information to the destination node, or the multiple switching nodes send the block description information to the source node, to enable the source node to send the block description information to the destination node, the source node may separately send, to the destination node, packet description information indicating a data packet included in each of the multiple data blocks. The packet description information may include an identifier of the data packet.

Figure 9:
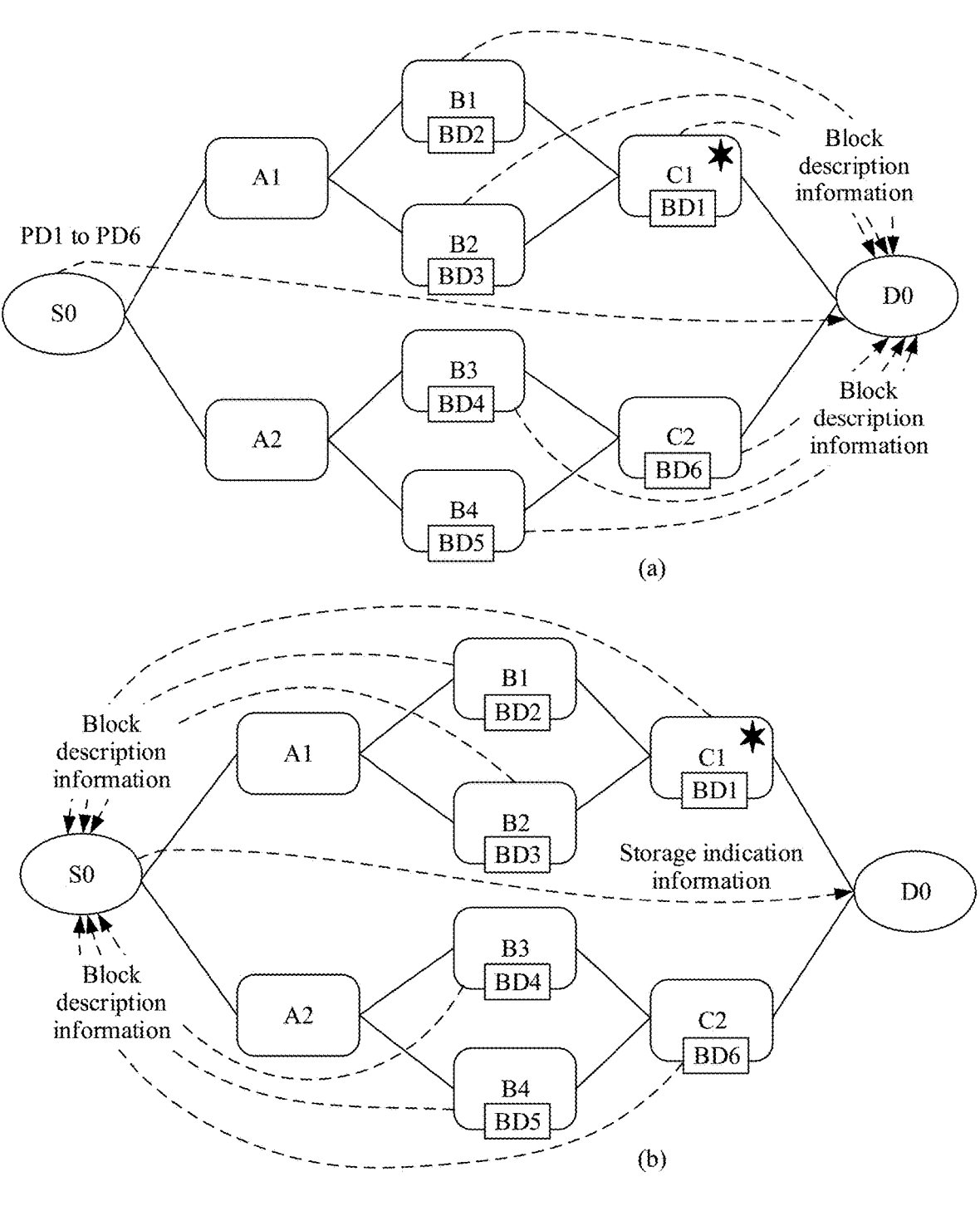
FIG. 9 is a diagram of sending block description information by multiple switching nodes according to an embodiment of this application.

For example, with reference to FIG. 8, as shown in (a) in FIG. 9, a process in which the multiple switching nodes (namely. B1 to B4, and C1 and C2) send the block description information to the destination node (namely, the destination server D0) includes the following steps: The switching node C1 sends block description information of DB1 to the destination server D0. The switching node B1 sends block description information of DB2 to the destination server D0 via C1. The switching node B2 sends block description information of DB3 to the destination server D0 via the switching node C1. The switching node B3 sends block description information of DB4 to the destination server D0 via the switching node C2. The switching node B4 sends block description information of DB5 to the destination server DO via the switching node C2. The switching node C2 sends block description information of DB6 to the destination server D0. The source server S0 sends, to the destination server D0, packet description information PD1 to PD6 corresponding to the multiple data blocks.

Alternatively, with reference to FIG. 8, as shown in (b) in FIG. 9, a process in which the multiple switching nodes (namely. B1 to B4, and C1 and C2) send the block description information to the source node (namely, the source server S0) includes the following steps: The switching node C1 sends block description information of DB1 to the source server S0 via the switching node B1 (or B2). The switching node B1 sends block description information of DB2 to the source server S0. The switching node B2 sends block description information of DB3 to the source server S0. The switching node B3 sends block description information of DB4 to the source server S0. The switching node B4 sends block description information of DB5 to the source server S0. The switching node C2 sends block description information of DB6 to the source server S0 via the switching node B3 (or B4). Then, the source server S0 sends storage indication information to the destination server D0. The storage indication information may include the block description information of DB1 to DB6, and may further include the packet description information PD1 to PD6 corresponding to DB1 to DB6.

S205: The destination node receives the multiple pieces of block description information from the multiple switching nodes, and determines a sequence of the multiple data blocks based on the multiple pieces of block description information. Alternatively, when the multiple switching nodes send the block description information to the source node. S205 may be specifically as follows: The destination node receives the storage indication information from the source node, where the storage indication information may include the multiple pieces of block description information; and determines a sequence of the multiple data blocks based on the multiple pieces of block description information.

When the destination node receives the multiple pieces of block description information, the destination node may determine the sequence of the corresponding multiple data blocks based on the multiple pieces of block description information, that is, determine a sequence of the multiple data blocks in the target data flow: Further, the destination node may further determine, based on the multiple block descriptions or the storage indication information, packet description information corresponding to each data block, that is, determine a quantity of data packets, a sequence of corresponding data packets, or the like included in each data block in the multiple data blocks.

For example, each piece of block description information includes a sequence number of a corresponding data block and a sequence number of a data packet included in the data block. The destination node determines the sequence of the multiple data blocks based on the sequence numbers of the data blocks in the multiple pieces of block description information, and determines a sequence of data packets in the multiple data blocks based on sequence numbers of data packets included in the data blocks.

S206: The destination node sends scheduling information to each switching node in the multiple switching nodes, where the scheduling information is used to schedule a data block stored in the switching node.

When the destination node needs to schedule the multiple data blocks of the target data flow: the destination node may schedule, when a throughput is ensured, the multiple data blocks successively based on the scheduling information according to the sequence of the multiple data blocks, so that the destination node successively obtains the multiple data blocks according to the sequence of the multiple data blocks, that is, the scheduling information is used to ensure a sequence of receiving the multiple data blocks by the destination node. In an embodiment, for each switching node in the multiple switching nodes, the scheduling information (for example, the scheduling information is a read command) that is sent to the switching node by the destination node may include an identifier of the switching node, a storage address of a scheduled data block in the switching node, an identifier of the data block, and the like. In FIG. 6, an example in which scheduling information is a read command is used for description.

Optionally, for any switching node, when the destination node reads a corresponding data block from the switching node based on the scheduling information, the destination node may obtain the data block through once scheduling, or may obtain the data block through repeated scheduling. When the destination node obtains the data block through repeated scheduling, the scheduling information sent by the destination node each time may further indicate a currently scheduled data amount, or indicate an identifier of a currently scheduled data packet, or the like.

For example, for each switching node in the multiple switching nodes, when the destination node is interconnected with the switching node, the destination node may directly send the scheduling information to the switching node. When the destination node is interconnected with the switching node via another switching node, the destination node may send the scheduling information to the switching node via the another switching node.

Figure 10:
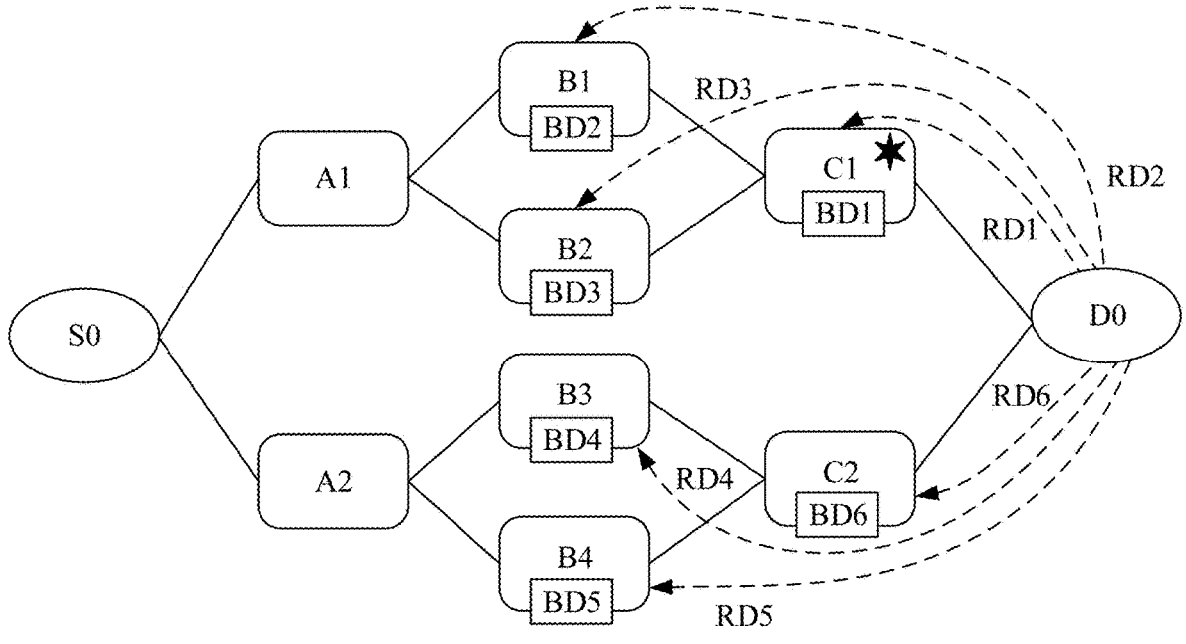
FIG. 10 is a diagram of scheduling multiple data blocks by a destination node according to an embodiment of this application.

For example, with reference to FIG. 7, as shown in FIG. 10, a process in which the destination node (namely, the destination server D0) sends the scheduling information to the multiple switching nodes (namely, B1 to B4, and C1 and C2) may include the following steps: sending a read command RD1 for scheduling DB1 to the switching node C1, sending, via the switching node C1, a read command RD2 for scheduling DB2 to the switching node B1, sending, via the switching node C1, a read command RD3 for scheduling DB3 to the switching node B2, sending, via the switching node C2, a read command RD4 for scheduling DB4 to the switching node B3, sending, via the switching node C2, a read command RD5 for scheduling DB5 to the switching node B4, and sending a read command RD6 for scheduling DB6 to the switching node C2.

In actual application, for a congestion flow; the destination node may create a source node-based request linked list, and perform fair scheduling on multiple data flows of the source node based on the request linked list. In addition, the destination node may further schedule a data flow based on different scheduling levels, for example, schedule the data flow based on egress ports, queue priorities, data flows, buffer pool linked lists, and the like. The buffer pool linked list may indicate a sequence and storage locations of multiple data blocks that are in a same data flow and that are stored in different switching nodes.

S207: When one switching node in the multiple switching nodes receives the scheduling information, the switching node sends a corresponding data block to the destination node.

When one switching node in the multiple switching nodes receives the corresponding scheduling information, the switching node may read the corresponding data block locally based on the scheduling information, and send the data block to the destination node, so that the destination node receives the data block. When the destination node receives the multiple data blocks according to the sequence of the multiple data blocks, the destination node may output the data blocks at a specific bandwidth or rate when receiving each data block, to output the multiple data blocks, so as to complete switching of the target data flow:

Optionally, for any switching node, when the destination node obtains the data block through once scheduling, the switching node may locally obtain the entire data block based on scheduling information, and send the data block to the destination node. When the destination node obtains the data block through repeated scheduling, the switching node may send, based on scheduling information, the data block to the destination node through repeated sending.

For any switching node in the multiple switching nodes, when the destination node is interconnected with the switching node, the switching node may directly send the data block to the destination node. When the destination node is interconnected with the switching node via another switching node, the switching node may send the data block to the destination node via the another switching node.

In this embodiment of this application, when the first switching node determines that congestion occurs in the target data flow: the first switching node may notify the source node. In this way, the source node may store the multiple data blocks of the target data flow in the multiple switching nodes respectively. To be specific, the source node may store the multiple data blocks in a larger-capacity buffer pool including the multiple switching nodes, so that the destination node can schedule a corresponding data block from the multiple switching nodes. Therefore, the data exchange network can provide a larger buffer, reduce congestion of the target data flow: avoid head-of-line blocking, and improve a capability of absorbing burst traffic, thereby improving data exchange efficiency and reducing an exchange delay.

The foregoing mainly describes the solutions provided in embodiments of this application from a perspective of interaction between the nodes. It may be understood that, to implement the foregoing functions, each network element, for example, a source node, a switching node, and a destination node, includes a corresponding hardware structure and/or software module for performing each function. A person skilled in the art should be easily aware that, in combination with units and algorithm steps of the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the source node, the switching node, and the destination node may be divided into functional modules based on the foregoing method examples. For example, each functional module may be obtained through division based on each corresponding function, or two or more functions may be integrated into one module. The foregoing integrated module may be implemented in a form of hardware, or may be implemented in a form of a software functional module. It should be noted that, in embodiments of this application, division into modules is an example, and is merely a logical function division. During actual implementation, another division manner may be used. An example in which each functional module is obtained through division based on each corresponding function is used below for description.

Figure 11:
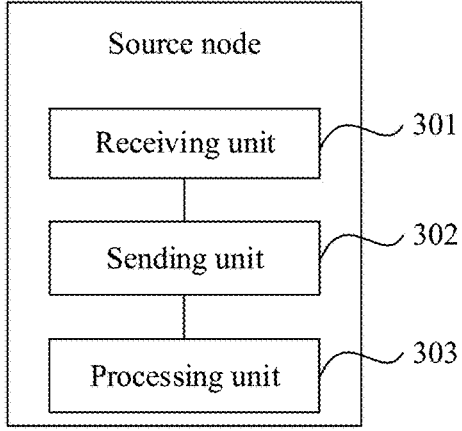
FIG. 11 is a diagram of a structure of a source node according to an embodiment of this application.

When an integrated unit is used. FIG. 11 is a diagram of a possible structure of a data exchange apparatus in the foregoing embodiments. The data exchange apparatus may be a source node or a chip built in the source node. The data exchange apparatus includes a receiving unit 301 and a sending unit 302. The receiving unit 301 is configured to support the data exchange apparatus in performing S201 and/or a step of receiving block description information sent by a switching node in the method embodiment. The sending unit 302 supports the data exchange apparatus in performing S202 and/or a step of sending storage indication information to a destination node in the method embodiment. Optionally, the data exchange apparatus may further include a processing unit 303. The processing unit 303 is configured to perform the steps of dividing, by the data exchange apparatus, to-be-exchanged data into multiple data blocks, parsing flow indication information, and/or parsing block description information. All related content of the steps in the foregoing method embodiment may be cited in function descriptions of corresponding functional modules. Details are not described herein again.

Based on implementation by hardware, in this application, the processing unit 303 may be a processor of the data exchange apparatus, the receiving unit 301 may be a receiver of the data exchange apparatus, and the sending unit 302 may be a transmitter of the data exchange apparatus. The transmitter and the receiver may usually be integrated together as a transceiver. Specifically: the transceiver may also be referred to as a communication interface.

Figure 12:
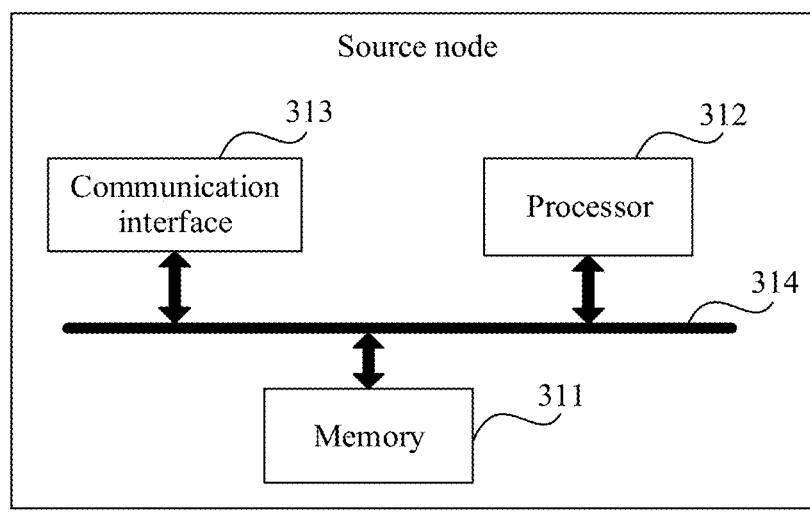
FIG. 12 is a diagram of a structure of another source node according to an embodiment of this application.

FIG. 12 is a diagram of a possible logical structure of a data exchange apparatus in the foregoing embodiments according to an embodiment of this application. The data exchange apparatus may be a source node or a chip built in the source node. The data exchange apparatus includes a processor 312 and a communication interface 313. The processor 312 is configured to control and manage an action of the data exchange apparatus. For example, the processor 312 is configured to support the data exchange apparatus in performing the steps of dividing to-be-exchanged data into multiple data blocks, parsing flow indication information, and parsing block description information in the method embodiment, and/or another process of the technology described in this specification. In addition, the data exchange apparatus may further include a memory 311 and a bus 314. The processor 312, the communication interface 313, and the memory 311 are connected to each other through the bus 314. The communication interface 313 is configured to support the data exchange apparatus in performing communication. The memory 311 is configured to store program code and data of the data exchange apparatus.

The processor 312 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 314 may be a peripheral component interconnect (PCI) bus, an extended industry standard architecture (EISA) bus, or the like. The bus may be classified into an address bus, a data bus, a control bus, and the like. For ease of representation, only one bold line indicates the bus in FIG. 12, but this does not mean that there is only one bus or only one type of bus.

Figure 13:
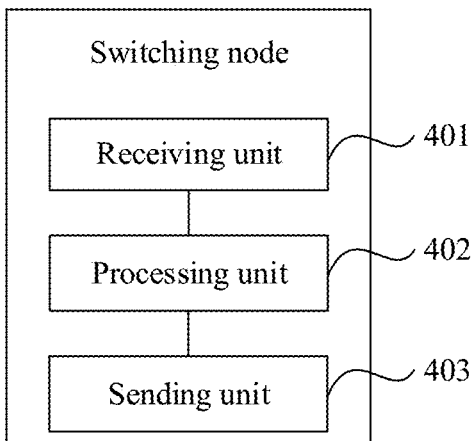
FIG. 13 is a diagram of a structure of a switching node according to an embodiment of this application.

When an integrated unit is used. FIG. 13 is a diagram of a possible structure of a data exchange apparatus in the foregoing embodiments. The data exchange apparatus may be a switching node or a chip built in the switching node. The data exchange apparatus includes a receiving unit 401 and a processing unit 402. The receiving unit 401 is configured to support the data exchange apparatus in performing the steps of receiving write data information and/or receiving scheduling information in the method embodiment. The processing unit 402 supports the data exchange apparatus in performing S203 in the method embodiment. Optionally, the data exchange apparatus may further include a sending unit 403. The sending unit 403 is configured to support the data exchange apparatus in performing the steps of sending flow indication information, sending block description information, and/or sending a data block in the foregoing embodiment. All related content of the steps in the foregoing method embodiment may be cited in function descriptions of corresponding functional modules. Details are not described herein again.

Based on implementation by hardware, in this application, the processing unit 402 may be a processor of the data exchange apparatus, the receiving unit 401 may be a receiver of the data exchange apparatus, and the sending unit 403 may be a transmitter of the data exchange apparatus. The transmitter and the receiver may usually be integrated together as a transceiver. Specifically, the transceiver may also be referred to as a communication interface.

Figure 14:
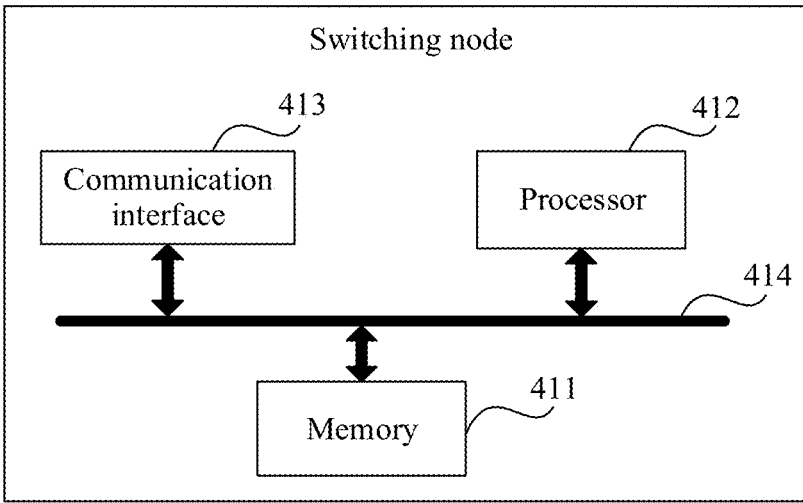
FIG. 14 is a diagram of a structure of another switching node according to an embodiment of this application.

FIG. 14 is a diagram of a possible logical structure of a data exchange apparatus in the foregoing embodiments according to an embodiment of this application. The data exchange apparatus may be a switching node or a chip built in the switching node. The data exchange apparatus includes a processor 412 and a communication interface 413. The processor 412 is configured to control and manage an action of the data exchange apparatus. For example, the processor 412 is configured to support the data exchange apparatus in performing S203 in the method embodiment, and/or another process of the technology described in this specification. In addition, the data exchange apparatus may further include a memory 411 and a bus 414. The processor 412, the communication interface 413, and the memory 411 are connected to each other through the bus 414. The communication interface 413 is configured to support the data exchange apparatus in performing communication. The memory 411 is configured to store program code and data of the data exchange apparatus.

The processor 412 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 414 may be a peripheral component interconnect (PCI) bus, an extended industry standard architecture (EISA) bus, or the like. The bus may be classified into an address bus, a data bus, a control bus, and the like. For ease of representation, only one bold line indicates the bus in FIG. 14, but this does not mean that there is only one bus or only one type of bus.

Figure 15:
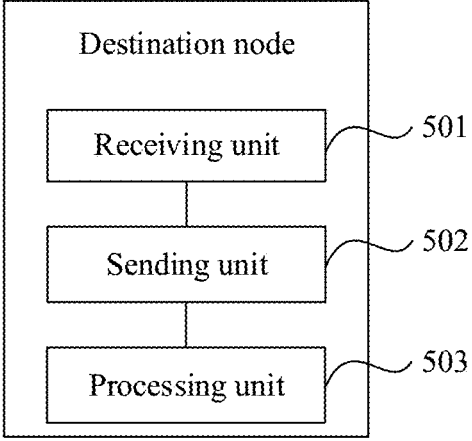
FIG. 15 is a diagram of a structure of a destination node according to an embodiment of this application.

When an integrated unit is used. FIG. 15 is a diagram of a possible structure of a data exchange apparatus in the foregoing embodiments. The data exchange apparatus may be a destination node or a chip built in the destination node. The data exchange apparatus includes a receiving unit 501 and a sending unit 502. The receiving unit 501 is configured to support the data exchange apparatus in performing the step of receiving block description information or storage indication information in the method embodiment. The sending unit 502 supports the data exchange apparatus in performing S206 in the method embodiment. Optionally, the data exchange apparatus may further include a processing unit 503, and the processing unit 503 is configured to perform S205 in the method embodiment performed by the data exchange apparatus. All related content of the steps in the foregoing method embodiment may be cited in function descriptions of corresponding functional modules. Details are not described herein again.

Based on implementation by hardware, in this application, the processing unit 503 may be a processor of the data exchange apparatus, the receiving unit 501 may be a receiver of the data exchange apparatus, and the sending unit 502 may be a transmitter of the data exchange apparatus. The transmitter and the receiver may usually be integrated together as a transceiver. Specifically: the transceiver may also be referred to as a communication interface.

Figure 16:
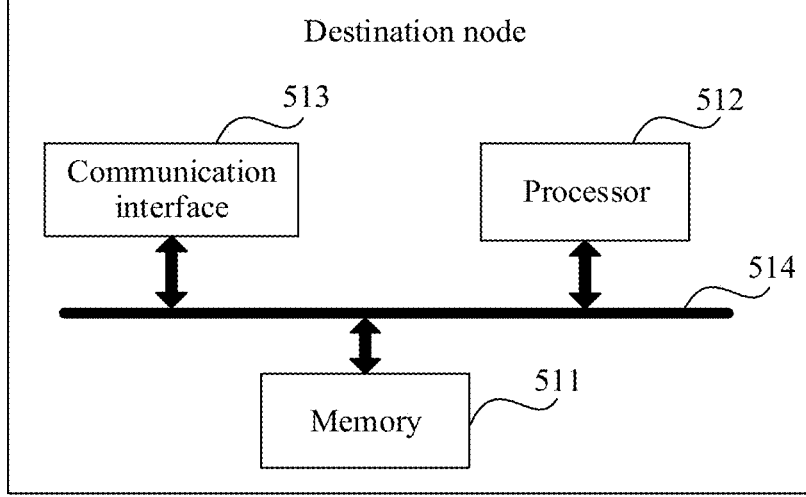
FIG. 16 is a diagram of a structure of another destination node according to an embodiment of this application.

FIG. 16 is a diagram of a possible logical structure of a data exchange apparatus in the foregoing embodiments according to an embodiment of this application. The data exchange apparatus may be a destination node or a chip built in the destination node. The data exchange apparatus includes a processor 512 and a communication interface 513. The processor 512 is configured to control and manage an action of the data exchange apparatus. For example, the processor 512 is configured to support the data exchange apparatus in performing S205 in the method embodiment, and/or another process of the technology described in this specification. In addition, the data exchange apparatus may further include a memory 511 and a bus 514. The processor 512, the communication interface 513, and the memory 511 are connected to each other through the bus 514. The communication interface 513 is configured to support the data exchange apparatus in performing communication. The memory 511 is configured to store program code and data of the data exchange apparatus.

The processor 512 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 514 may be a peripheral component interconnect (PCI) bus, an extended industry standard architecture (EISA) bus, or the like. The bus may be classified into an address bus, a data bus, a control bus, and the like. For ease of representation, only one bold line indicates the bus in FIG. 16, but this does not mean that there is only one bus or only one type of bus.

In another embodiment of this application, a data exchange network is further provided. The data exchange network includes a source node, a switching node, and a destination node. The source node may be the source node provided in the foregoing apparatus embodiments, and is configured to support the source node in performing a step of the source node in the method embodiments: the switching node is the switching node provided in the foregoing apparatus embodiments, and is configured to support the switching node in performing a step of the switching node in the method embodiments; and/or, the destination node is the destination node provided in the foregoing apparatus embodiments, and is configured to support the destination node in performing a step of the destination node in the method embodiments.

The source node, the switching node, and the destination node in the apparatus embodiments of this application may correspond to the source node, the switching node, and the destination node in the method embodiments of this application respectively. In addition, modules and other operations and/or functions of the source node, the switching node, and the destination node are used to implement corresponding procedures of the foregoing method embodiments. For brevity, the descriptions of the method embodiments of this application are applicable to the apparatus embodiments. Details are not described herein again.

For beneficial effects of the apparatus embodiments of this application, refer to the beneficial effects in the foregoing corresponding method embodiments. Details are not described herein again. In addition, for descriptions of related content in the apparatus embodiments of this application, refer to the foregoing corresponding method embodiments.

A person of ordinary skill in the art may be aware that units and algorithm steps in the examples described with reference to embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiments. Details are not described herein again.

In the several embodiments provided in this application, it should be understood that the disclosed system, apparatus, and method may be implemented in other manners. For example, the foregoing described apparatus embodiments are merely examples. For example, division into the units is merely a logical function division and may be another division during actual implementation. For example, multiple units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on multiple network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions in this application essentially, or the part contributing to the conventional technologies, or some of the technical solutions may be implemented in a form of a software product. A computer software product is stored in a storage medium, and includes several instructions for instructing a computer device (which may be a personal computer, a server, a network device, or the like) to perform all or some of the steps of the methods described in embodiments of this application.

In another embodiment of this application, a readable storage medium is further provided. The readable storage medium stores computer-executable instructions. When a device (which may be a single-chip microcomputer, a chip, or the like) or a processor performs a step of a source node in the data exchange method provided in the foregoing method embodiments, the foregoing readable storage medium may include any medium that can store program code, such as a USB flash drive, a removable hard disk, a read-only memory, a random access memory, a magnetic disk, or an optical disc.

In another embodiment of this application, a readable storage medium is further provided. The readable storage medium stores computer-executable instructions. When a device (which may be a single-chip microcomputer, a chip, or the like) or a processor performs a step of a switching node in the data exchange method provided in the foregoing method embodiments, the foregoing readable storage medium may include any medium that can store program code, such as a USB flash drive, a removable hard disk, a read-only memory, a random access memory, a magnetic disk, or an optical disc.

In another embodiment of this application, a readable storage medium is further provided. The readable storage medium stores computer-executable instructions. When a device (which may be a single-chip microcomputer, a chip, or the like) or a processor performs a step of a destination node in the data exchange method provided in the foregoing method embodiments, the foregoing readable storage medium may include any medium that can store program code, such as a USB flash drive, a removable hard disk, a read-only memory, a random access memory, a magnetic disk, or an optical disc.

In another embodiment of this application, a computer program product is further provided. The computer program product includes computer-executable instructions, and the computer-executable instructions are stored in a computer-readable storage medium. At least one processor of a device may read the computer-executable instructions from the computer-readable storage medium, and the at least one processor executes the computer-executable instructions to enable the device to implement a step of a source node in the data exchange method provided in the foregoing method embodiments.

In another embodiment of this application, a computer program product is further provided. The computer program product includes computer-executable instructions, and the computer-executable instructions are stored in a computer-readable storage medium. At least one processor of a device may read the computer-executable instructions from the computer-readable storage medium, and the at least one processor executes the computer-executable instructions to enable the device to implement a step of a switching node in the data exchange method provided in the foregoing method embodiments.

In another embodiment of this application, a computer program product is further provided. The computer program product includes computer-executable instructions, and the computer-executable instructions are stored in a computer-readable storage medium. At least one processor of a device may read the computer-executable instructions from the computer-readable storage medium, and the at least one processor executes the computer-executable instructions to enable the device to implement a step of a destination node in the data exchange method provided in the foregoing method embodiments.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A data exchange method, wherein the method comprises:

receiving, by a source node, flow indication information from a first switching node, wherein the flow indication information indicates that congestion occurs in a target data flow, and the first switching node is a node in a switching path of the target data flow; and sending, by the source node, multiple pieces of write data information and multiple data blocks of the target data flow to multiple switching nodes, wherein the multiple pieces of write data information indicate to the multiple switching nodes to store the multiple data blocks and to stop forwarding the multiple data blocks.

2. The method according to claim 1, wherein after the sending, by the source node, multiple pieces of write data information and multiple data blocks of the target data flow to multiple switching nodes, the method further comprises:

receiving, by the source node, multiple pieces of block description information from the multiple switching nodes, wherein the multiple pieces of block description information correspond one-to-one to the multiple data blocks, and each piece of block description information indicates information about a node that stores a corresponding data block; and sending, by the source node, the multiple pieces of block description information to a destination node.

3. The method according to claim 1, wherein before the sending, by the source node, multiple pieces of write data information and multiple data blocks of the target data flow to multiple switching nodes, the method further comprises:

dividing, by the source node, to-be-exchanged data in the target data flow into the multiple data blocks, wherein a quantity of the multiple data blocks is greater than or equal to a quantity of the multiple switching nodes.

4. The method according to claim 1, wherein a ranking of a data block corresponding to one switching node in the multiple switching nodes in the multiple data blocks is consistent with a ranking of a distance corresponding to the switching node in multiple distances arranged in ascending order, the distance corresponding to the switching node is a distance between the switching node and the first switching node, and the multiple distances comprise distances between the multiple switching nodes and the first switching node.

5. A data exchange method, wherein the method comprises:

sending, by a switching node, flow indication information to a source node, wherein the flow indication information indicates that congestion occurs in a target data flow, and the switching node is a node in a switching path of the target data flow;

receiving, by the switching node, write data information and a data block of the target data flow from the source node, wherein the write data information indicates to the switching node to store the data block and to stop forwarding the data block;

storing, by the switching node, the data block based on the write data information;

receiving, by the switching node, scheduling information from a destination node, wherein the scheduling information is used to schedule the data block; and sending, by the switching node, the data block to the destination node.

6. The method according to claim 5, wherein after the storing, by the switching node, the data block based on the write data information, the method further comprises:

sending, by the switching node, block description information of the data block to the destination node: or sending, by the switching node, block description information of the data block to the source node, wherein the block description information indicates information about a node that stores the data block.

7. A data exchange apparatus, wherein the apparatus serves as a source node and comprises:

at least one processor and one or more memories, wherein the one or more memories are configured to store instructions or program code; and the at least processor is configured to execute the instructions or the program code in the one or more memories, to enable the apparatus to:

receive flow indication information from a first switching node, wherein the flow indication information indicates that congestion occurs in a target data flow, and the first switching node is a node in a switching path of the target data flow; and send multiple pieces of write data information and multiple data blocks of the target data flow to multiple switching nodes, wherein the multiple pieces of write data information indicate to the multiple switching nodes to store the multiple data blocks and to stop forwarding the multiple data blocks.

8. The apparatus according to claim 7, wherein the at least processor is further configured to execute the instructions or the program code in the one or more memories, to enable the apparatus to:

receive multiple pieces of block description information from the multiple switching nodes, wherein the multiple pieces of block description information correspond one-to-one to the multiple data blocks, and each piece of block description information indicates information about a node that stores a corresponding data block; and send the multiple pieces of block description information to a destination node.

9. The apparatus according to claim 7, wherein the at least processor is configured to execute the instructions or the program code in the one or more memories, to enable the apparatus to:

divide to-be-exchanged data in the target data flow into the multiple data blocks, wherein a quantity of the multiple data blocks is greater than or equal to a quantity of the multiple switching nodes.

10. The apparatus according to claim 7, wherein a ranking of a data block corresponding to one switching node in the multiple switching nodes in the multiple data blocks is consistent with a ranking of a distance corresponding to the switching node in multiple distances arranged in ascending order, the distance corresponding to the switching node is a distance between the switching node and the first switching node, and the multiple distances comprise distances between all of the multiple switching nodes and the first switching node.

* * * * *